United States Patent
Sarkkinen et al.

(10) Patent No.: US 7,171,224 B2
(45) Date of Patent: Jan. 30, 2007

(54) METHOD AND ARRANGEMENT FOR MAINTAINING SYNCHRONIZATION IN ASSOCIATION WITH RESETTING A COMMUNICATION CONNECTION

(75) Inventors: Sinikka Sarkkinen, Kangasala (FI); Juha Mikola, Helsinki (FI)

(73) Assignee: Nokia Corporation, Espoo (FI)

( * ) Notice: Subject to any disclaimer, the term of this patent is extended or adjusted under 35 U.S.C. 154(b) by 573 days.

(21) Appl. No.: 09/832,051

(22) Filed: Apr. 10, 2001

(65) Prior Publication Data

US 2001/0029188 A1 Oct. 11, 2001

(30) Foreign Application Priority Data

Apr. 10, 2000 (FI) .................................. 20000855

(51) Int. Cl.
*H04B 7/01* (2006.01)
(52) U.S. Cl. .................. 455/502; 455/517; 370/503; 714/707
(58) Field of Classification Search ................ 455/502, 455/436, 517; 370/353, 354, 328, 469, 502, 370/304, 324, 350, 395.62, 453, 457, 503, 370/507, 509–514, 520; 375/293, 354–359, 375/362–366, 368; 714/707
See application file for complete search history.

(56) References Cited

U.S. PATENT DOCUMENTS

| | | | |
|---|---|---|---|
| 5,046,066 A | 9/1991 | Messenger | 370/94.1 |
| 5,610,595 A | 3/1997 | Garrabrant et al. | 340/825.52 |
| 5,673,031 A | 9/1997 | Meier | 340/825.08 |
| 5,721,733 A | 2/1998 | Wang et al. | 370/332 |
| 5,754,586 A * | 5/1998 | Carsello | 375/213 |
| 5,765,106 A | 6/1998 | Violante et al. | 455/410 |
| 5,926,468 A * | 7/1999 | Chapman et al. | 370/328 |

FOREIGN PATENT DOCUMENTS

EP 0707394 A1 4/1996

(Continued)

OTHER PUBLICATIONS

TSG-RAN Working Group 2 (Radio Layer 2 and Radiio Layer 3) Stockholm, Mar. 8-11, 1999 (TSGR2#2(99)148).*

(Continued)

*Primary Examiner*—Edward F. Urban
*Assistant Examiner*—Raymond S. Dean
(74) *Attorney, Agent, or Firm*—Perman & Green, LLP

(57) ABSTRACT

A method and an arrangement are disclosed for resetting a communication connection between a first communication device and a second communication device in a cellular radio system. Firstly, there is detected the need for resetting the communication connection. There is transmitted from the first communication device to the second communication device a first piece of information indicating the need for resetting the communication connection. A resetting procedure is performed at the second communication device, and there is transmitted from the second communication device to the first communication device a second piece of information indicating the completion of the resetting procedure with respect to the second communication device. There is also inserted into a certain piece of information transmitted between the first communication device and the second communication device an indication of an effective number of certain resetting operations associated with a certain detected need for resetting the communication connection.

21 Claims, 10 Drawing Sheets

FOREIGN PATENT DOCUMENTS

| | | |
|---|---|---|
| EP | 0872982 A1 | 10/1998 |
| EP | 0933962 A3 | 8/1999 |
| GB | 2303027 | 2/1997 |
| JP | 02-002282 | 1/1990 |
| JP | 11-041281 | 6/1998 |
| JP | 10-173668 | 2/1999 |
| WO | WO 96/38994 | 12/1996 |
| WO | WO 00/21220 | 4/2000 |
| WO | WO 00/69206 | 11/2000 |

OTHER PUBLICATIONS

TSG-RAN Working Group 2 (Radio Layer 2 and Radiio Layer 3) Stockholm, Mar. 8-11, 1999 (TSGR2#2(99)150).*

Mouly/Pautet, "GSM—The System For Mobile Communication", 1992, p. 637, paragraph 9.5.2.

ETSI TS 125 322, V3.1.2, Technical Specification, "Universal Mobile Telecommunications System (UMTS); RLC Protocol Specification".

* cited by examiner

METHOD AND ARRANGEMENT FOR MAINTAINING SYNCHRONIZATION IN ASSOCIATION WITH RESETTING A COMMUNICATION CONNECTION

TECHNOLOGICAL FIELD

The invention concerns generally the technology of keeping the communication connections functional between base stations and terminals of a cellular radio system. Especially the invention concerns the task of maintaining certain synchronization aspects during the procedure of resetting a communication connection.

BACKGROUND OF THE INVENTION

The specifications of cellular radio systems define certain protocol stacks consisting of protocol layers which the communicating devices must implement. Certain protocol layers serve as peer entities to each other in a pair of devices which have a communication connection between them. The specifications also define certain procedures for setting up, maintaining and tearing down the communication connections between such peer entities.

As an example we consider the specifications of the UMTS (Universal Mobile Telecommunications System), and especially the RLC (Radio Link Control) layers of a MS (Mobile Station) and an RNC (Radio Network Controller) which are peer entities to each other. For acknowledged mode operation there has been defined, in a published technical specification known as ETSI TS 125 322 V3.1.2 (2000-01) where ETSI comes from European Telecommunications Standards Institute, a RESET procedure for the RLC layer. Said technical specification is incorporated herein by reference. The RESET procedure is used to reset peer RLC entities in the RNC and the MS in a situation where a protocol error has been discovered by any of the peer RLC entitites. The task of the RESET procedure is to reset all corresponding protocol parameters in both peer entities in order to solve the error situation and to continue data transmission by using the same network resources and the initial RLC parameters. At the same time when protocol parameters are reset the RLC layer must increase the value of the HFN (Hyper Frame Number) by one in order to prevent the RLC layer from reusing the same ciphering mask to soon.

The known RESET procedure relies on the exchange of certain PDUs (Protocol Data Units) between the peer RLC entities and works well when the PDUs travel between the RNC and the MS without problems. However, the known RESET procedure fails in a situation where at least one PDU is lost due to a communication error. FIG. 1 illustrates a situation where the communicating entities have been designated as the sender and the receiver according to the direction of travel of the first PDU related to the RESET procedure. At step 101 the sender notes a protocol error on the RLC layer, which means that a RESET procedure must be initiated. Let us assume that the current HFN (Hyper-Frame Number) at the time of discovering the protocol error is M. The sender initiates the RESET prodedure by sending, at step 102, a certain RESET PDU to the receiver. The RESET PDU is designated as 103. At the same time the sender sets a timer which is known as the Timer_RST. The time between the setting and expiry of the timer is shown in FIG. 1 as a line of black dots.

At step 104 the receiver receives the RESET PDU and thereby becomes aware of the need for resetting the RLC level operation. At step 105 it resets all protocol parameters and increases the current value of the HFN by one to M+1. After having completed these tasks the receiver sends at step 106 an acknowledgement 107 known as the RESET ACK PDU. The purpose of the acknowledgement 107 is to inform the sender that the RLC layer resetting has been completed in the receiver. Note that the designations "sender" and "receiver" continue to refer to the transmission direction of the first PDU 103.

At step 108 the acknowledgement 107 gets lost or corrupted due to a communication error. It never reached the sender, so he is not aware of the acknowledgement 107 having been sent at all. At step 109 the Timer_RST expires, which causes the sender to send a new RESET PDU 110 and set the Timer_RST again; the dots shifted slightly to the left represent the new timing round of the Timer_RST. The current HFN value at the sender is still M.

At step 111 the receiver receives the latter RESET PDU 110. It has no means of knowing that the acknowledgement 107 was lost, which means that upon receiving the second RESET PDU 110 the receiver again resets all protocol parameters at step 112 and again increases the current value of the HFN by one, this time to M+2. After having completed these tasks the receiver sends at step 113 an acknowledgement 114. This time the acknowledgement gets through to the sender, which receives it as step 115 and resets all protocol parameters for its part at step 116 and increases the current value of the HFN by one to M+1. The result of one RESET ACK PDU 107 having been lost without a trace is that after step 116 the HFN values in the sender and the transmitter are different, in other words the HFN synchronization between the sender and the receiver is lost. This in turn causes deciphering to fail in the continued RLC connection, so that the only possibility is to release the corresponding radio bearer and to set up a new one which causes delay and unnecessary signalling load.

SUMMARY OF THE INVENTION

It is an object of the invention to provide a method and an arrangement for resetting a communication connection with good robustness against the disappearance of transmitted information related to the resetting procedure.

The object of the invention is achieved by including a sequence number in at least those pieces of transmitted information which cause changes that are relevant to synchronization.

The invention concerns a method for resetting a communication connection between a first communication device and a second communication device in a cellular radio system, comprising the steps of:
  detecting the need for resetting the communication connection,
  transmitting from the first communication device to the second communication device a first piece of information indicating the need for resetting the communication connection,
  performing a resetting procedure at the second communication device, and
  transmitting from the second communication device to the first communication device a second piece of information indicating the completion of the resetting procedure;

the method is characterized in that it comprises the step of inserting into a certain piece of information transmitted between the first communication device and the second communication device an indication of an effective number of certain resetting operations associated with a certain detected need for resetting the communication connection.

The invention applies also to a communication device for communicating between another communicating device within a cellular radio system over a communication connection, the device comprising means for detecting a need for resetting the communication connection, transmission means for transmitting to the other communication device first pieces of information indicating the need for resetting the communication connection and second pieces of information indicating the completion of the resetting procedure, receiving means for receiving from the other communication device first pieces of information indicating the need for resetting the communication connection and second pieces of information indicating the completion of the resetting procedure, and resetting means for performing a resetting procedure for the communication connection;

the device is characterized in that it comprises means for inserting into a certain piece of information transmitted between it and the other communication device an indication of an effective number of certain resetting operations associated with a certain detected need for resetting the communication connection.

The synchronization failure which may follow from an attempted prior art resetting procedure is caused by the fact that the receiver of the piece of information which calls for initiating the resetting procedure has no means of knowing, whether the piece of information is a genuine one or a resent copy. By placing a sequence number into that piece of information the sender may indicate, whether it is the first or a subsequent attempt of sending the piece of information.

The receiver of the piece of information which calls for initiating the resetting procedure checks the sequence number and compares it against the sequence number received in the immediately previous corresponding piece of information it has received. If the sequence number indicates the latter version to be a resent copy, the receiver does not change the synchronization aspects any more but just sends its acknowledgement.

An alternative way of viewing of the problem is to say that the receiver of that piece of information which acknowledges a completed resetting procedure at the other end of the communication connection has no means of knowing, whether the acknowledgement is a genuine one or a resent copy. By placing a sequence number into the acknowledgement the communicating party which sends the acknowledgement may indicate, whether it is the first or a subsequent attempt of acknowledging.

According to the latter approach the device which receives the acknowledgement, i.e. the device which was the original initiator of the resetting procedure, checks the sequence number and compares it against some previously stored information that describes the synchronization aspects before the lately initiated resetting procedure. If the sequence number indicates that the device at the other end has received multiple initiations for resetting, the device which received the acknowledgement changes its synchronization aspects accordingly.

In a very simple embodiment of the invention the sequence number need not be any longer than one bit. In all subsequent copies of a piece of information which calls for initiating the resetting procedure the value of the sequence number bit is the same as in the original one. Only if one resetting procedure has been successfully completed and there comes a need for initiating another, the value of the sequence number bit is changed. In an acknowledgement the sequence number indicates the number of changes made to the synchronization aspects.

BRIEF DESCRIPTION OF DRAWINGS

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

FIG. 1 has been described above within the description of prior art, so the following discussion will focus on FIGS. 2 to 9.

DETAILED DESCRIPTION OF THE INVENTION

Figure 1:
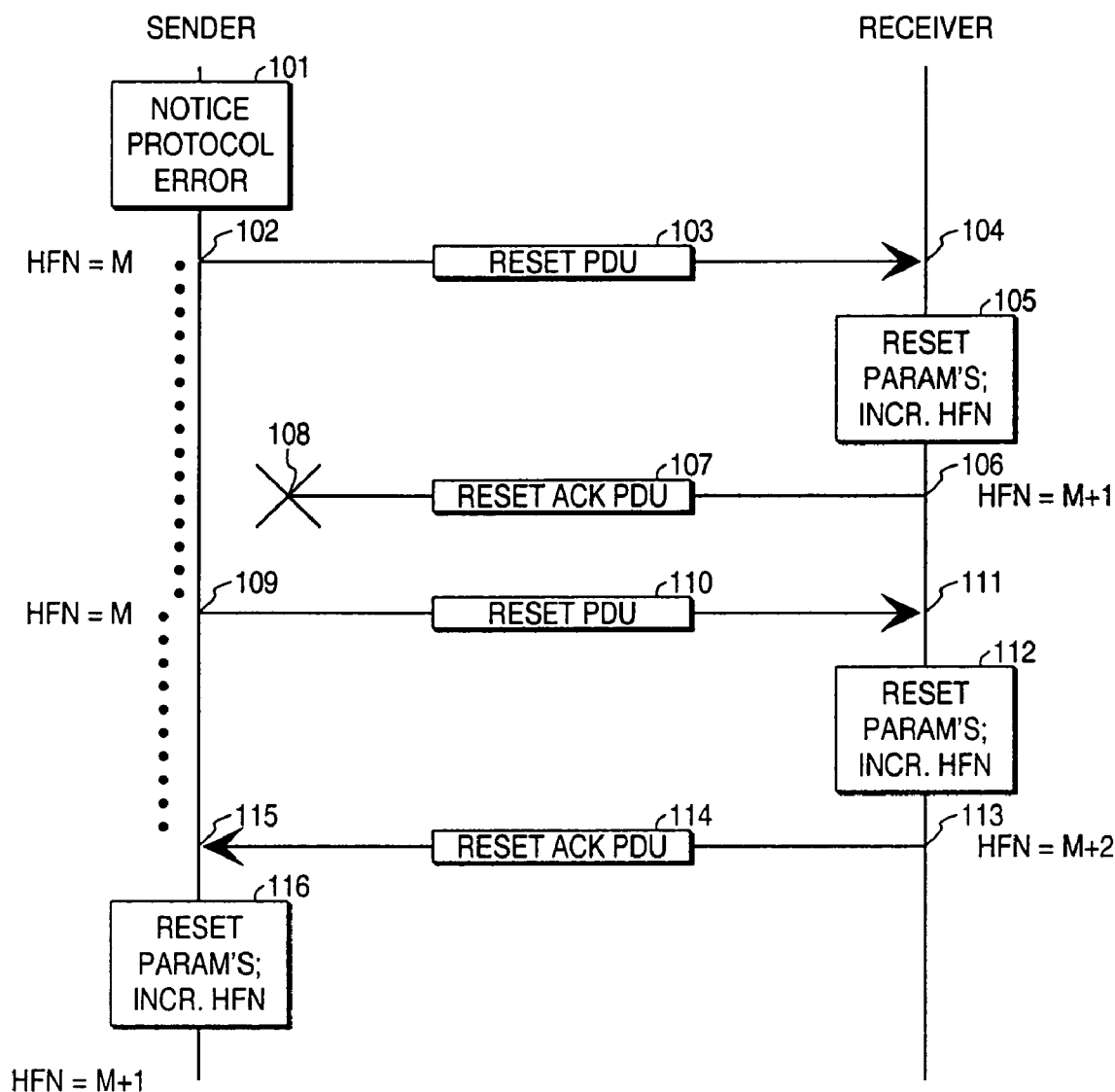
FIG. 1 illustrates a known resetting procedure.
Figure 2:
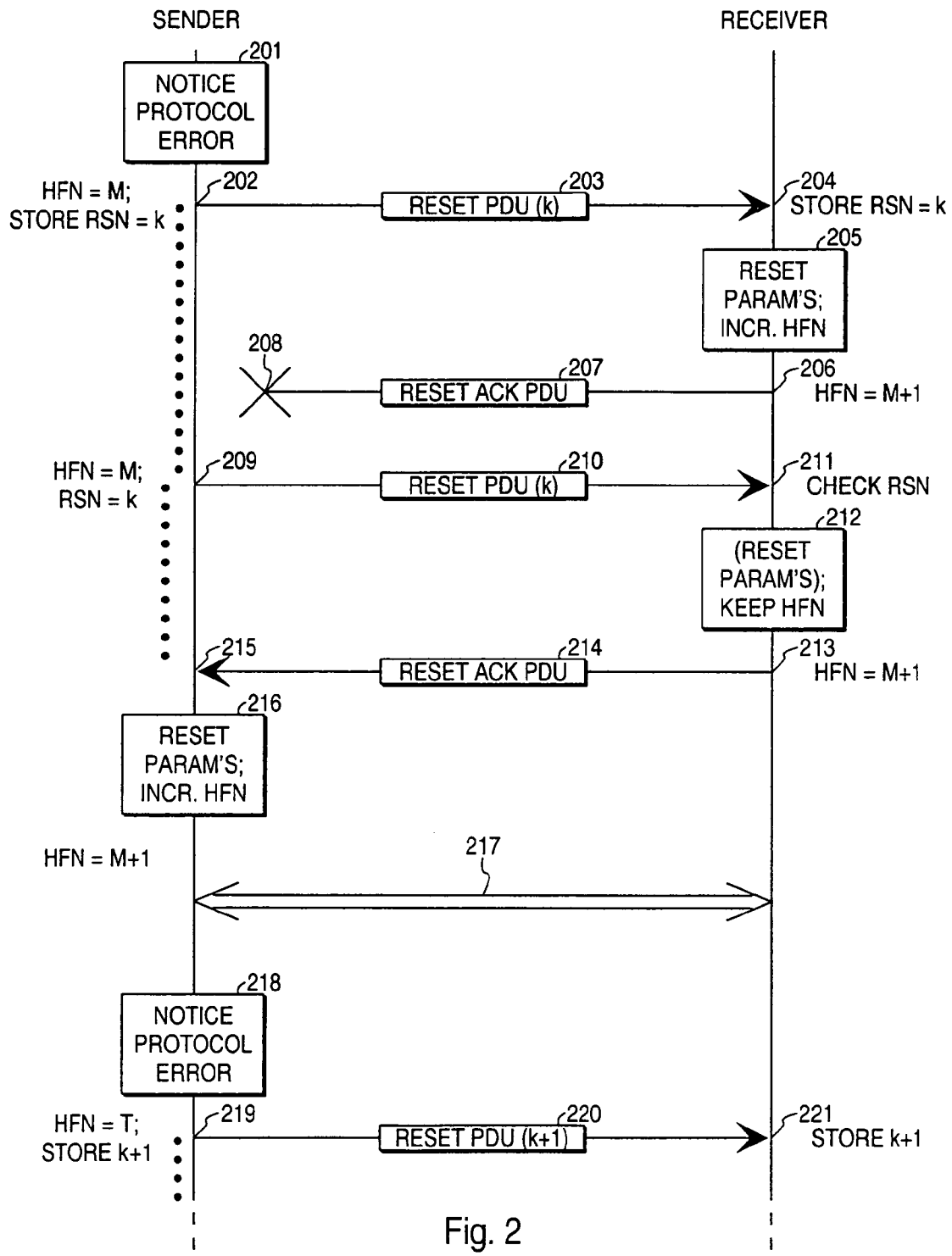
FIG. 2 illustrates a resetting procedure according to an embodiment of the invention.

FIG. 2 illustrates a situation where the communicating entities have been designated as the sender and the receiver according to the direction of travel of the first PDU related to the RESET procedure in the same manner as in FIG. 1. At step 201 the sender notes a protocol error on the RLC layer, which means that a RESET procedure must be initiated. Let us again assume that the current HFN at the time of discovering the protocol error is M. The sender initiates the RESET prodedure by sending, at step 202, a certain RESET PDU to the receiver. The RESET PDU is designated as 203. At the same time the sender sets the timer Timer_RST. The running time of the timer is again shown in FIG. 2 as a line of black dots.

According to the invention the RESET PDU 203 contains a sequence number, which we denote as the RSN or Reset Sequence Number, the value of which is k for the transmitted RESET PDU 203. In association with formulating and sending the RESET PDU 203 at step 202 the sender stores the value k of the RSN included in the RESET PDU 203. At step 204 the receiver receives the RESET PDU 203 and thereby becomes aware of the need for resetting the RLC level operation. It also receives and stores the value k of the RSN. At step 205 the receiver resets all protocol parameters and increases the current value of the HFN by one to M+1. After having completed these tasks the receiver sends at step 206 a RESET ACK PDU 207.

If the acknowledgement reaches the sender without problems, the resetting procedure is completed in the normal manner and the novel features added by the present invention do not come into significant use. However, we assume that at step 208 the acknowledgement 207 gets lost or corrupted due to a communication error. It never reached the sender in decodable shape, so the sender is not aware of the acknowledgement 207 having been sent at all. At step 209 the Timer_RST expires, which causes the sender to send a new RESET PDU 210. The current HFN value at the sender is still M.

According to the invention the sender notes at step 209 that the new RESET PDU 210 is actually a resent copy of the previous RESET PDU 203, because no acknowledgement was received concerning the previous RESET PDU 203 before the expiry of the Timer_RST. Therefore the sender reads the stored value k of the RSN which was included in the previous RESET PDU 203 and includes it as such to the new RESET PDU 210.

At step 211 the receiver receives the latter RESET PDU 210. Now the receiver checks the value of the RSN in the new RESET PDU 210 and compares it against the previously stored value k received in the first RESET PDU 203. The receiver notes that these two values are the same, from which it may deduce that the acknowledgement 207 was lost. This means that upon receiving the second RESET PDU 210 the receiver does not reset the protocol parameters at step 212, or at least does not increase the current value of the HFN any more. Resetting the protocol parameters once more at step 212 would not do any harm, because the same original RLC parameter values would be reverted to anyway. After step 212 the receiver sends at step 213 a new acknowledgement 214.

This time the acknowledgement gets through to the sender, which receives it at step 215 and resets all protocol parameters for its part at step 216 and increases the current value of the HFN by one to M+1. Since the receiver did not increase the value of the HFN any more at step 212 after finding that the value of the RSN in the second RESET PDU 210 was k, i.e. the same as in the first RESET PDU 203, one RESET ACK PDU 207 having been lost without a trace does not result in the HFN values in the sender and the transmitter being different, which means that the HFN synchronization between the sender and the receiver is maintained.

The operation of the sender and receiver devices remains the same even if also the second RESET ACK PDU 214 were lost or corrupted. In such a case the sender could transmit a third RESET PDU where the value of the RSN would still be the same as in the first and second RESET PDUs, so that the steps 211, 212 and 213 would be repeated at the receiver. In order not to keep the communication resources reserved in a situation where interference conditions or other error sources are severe enough to make the continuation of communication impossible, it may be reasonable to set a limit for the maximum number of times of attempting the resetting procedure by the sender.

At step 217 RLC level communication is continued between the sender and the receiver. At step 218 the sender again realizes that there has happened a protocol error on the RLC layer, which means that a RESET procedure must again be initiated. We may assume that the current HFN if now T. The sender initiates again the RESET prodedure by sending, at step 219, a certain RESET PDU to the receiver. The RESET PDU is designated as 220. Because the newest RESET PDU 220 is not a resent copy of some other RESET PDU, the RSN value contained therein is now something else than k, say k+1 (although we designate RSN as the sequence number, it is not essential that there is a certain well-defined relationship between the sequence number values of the RESET PDUs 203 and 220; it suffices that the two are different). In association with formulating and sending the new RESET PDU 220 at step 219 the sender stores the value k+1 included in the RESET PDU 220. From the reception 221 of the RESET PDU 220 at the receiver the operation follows the steps described previously.

Had it been the receiver and not the sender which noticed the new protocol error on the RLC layer at step 218, the operation would be otherwise the same as described above, but even the sole requirement of the value of the sequence number in the newest RESET PDU being different than in the previous RESET PDU 203 can now be released. There is no risk of confusion, since the reception and storing of a sequence number read from a received RESET PDU in a certain device is different than the storing of a sequence number included in a RESET PDU transmitted by that device. However, certain advantage may also be gained by associating a sequence number unequivocally with a certain individual resetting procedure regardless of its initiator; for example if a sequence number is used which is considerably longer than one bit and incrementing it by one each time during a RLC level connection when a resetting procedure has to be undertaken, the value of the sequence number can be used as an indicator of the observed statistical quality of the communication connection.

Figure 3:
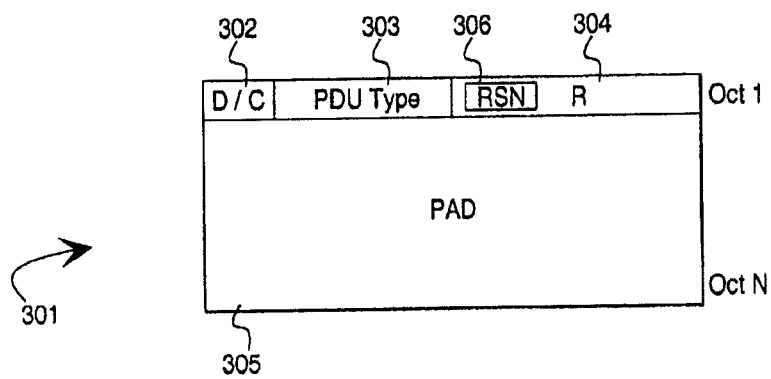
FIG. 3 illustrates an advantageous structure of a protocol data unit which is used as a part of the invention.

FIG. 3 illustrates a PDU structure which can advantageously be used in constructing the RESET PDUs in the procedure explained above. The PDU 301 is N octets long and comprises a D/C field 302, a PDU Type field 303, a R field 304 and a PAD field 305. Of these the D/C field 302 is for indicating whether the PDU comprises Data or Control information, the PDU Type field 303 contains an identifier which indicates the PDU type in question, the R field 304 contains Reserved bits and the PAD field is a padding field the purpose of which is to harmonize the length of the PDU 301 with general PDU definitions given in the specifications of the cellular radio system in question.

The minimum length of the sequence number k is one bit, so that just checking whether the bit in question is 0 or 1 is enough to tell, whether a certain received PDU is a genuine original one or a resent copy. Especially if the sequence number is just one bit but actually also regardless of the length of the sequence number the increasing of the sequence number by one when starting a new resetting procedure must by understood as a cyclical operation where adding one to the largest possible sequence number value gives the smallest possible sequence number value as a result.

The sequence number can basically be placed into an arbitrary location within the R field 304 or the PAD field 305. Especially if only one bit is used as the sequence number, specifying one of the reserved bits of the R field 304 is reasonable. In FIG. 3 we have assumed that one of the bits in the R field is designated as the RSN or Reset Sequence Number bit 306.

Figure 4A:
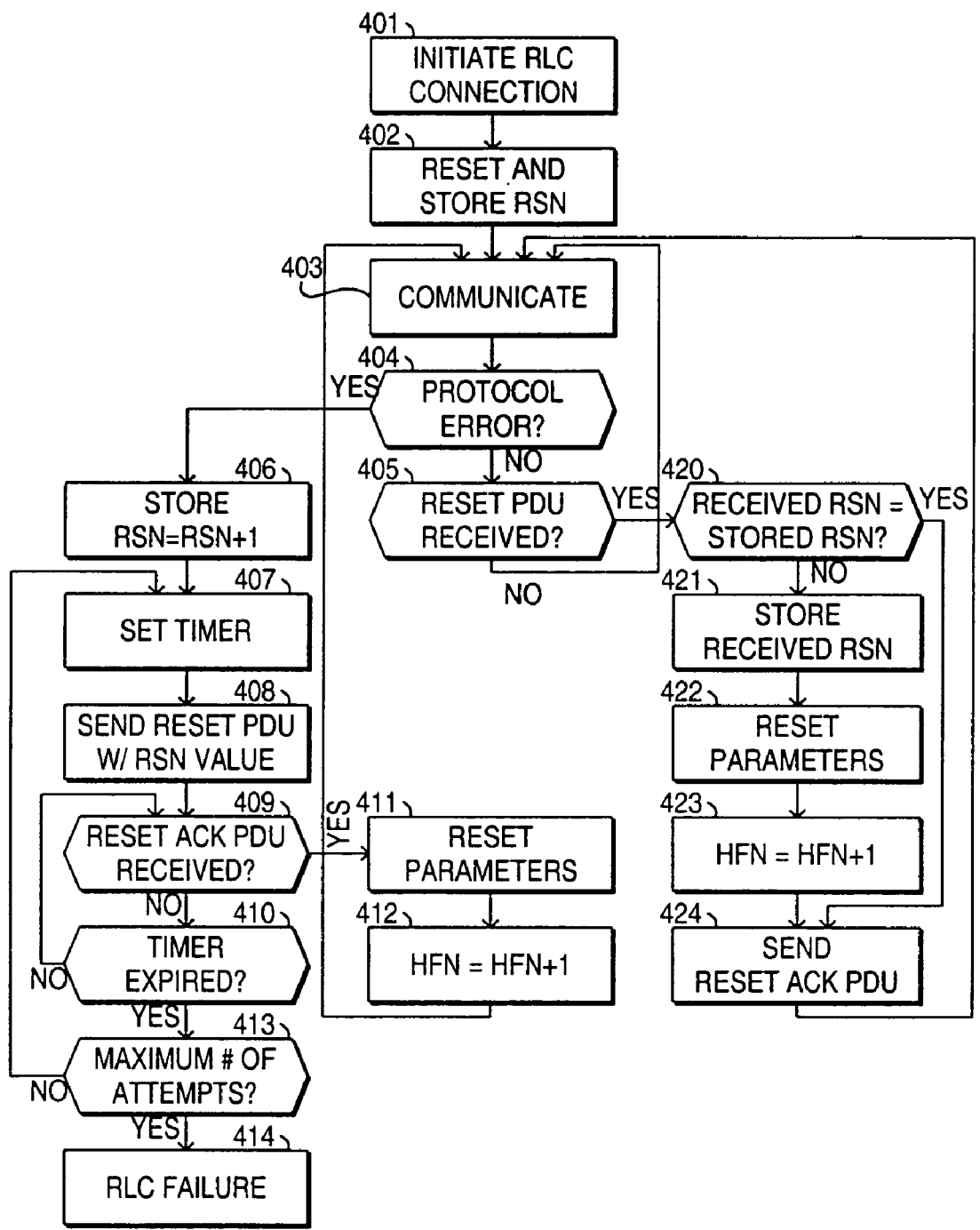
FIG. 4a illustrates the operation of a communication device according to an embodiment of the invention.

FIG. 4a illustrates the method described above in the form of a flow diagram which the operation of a communication device may follow. At step 401 the establishing of an RLC level communication connection is initiated, and as a part of the initiating procedures an initial value for the RSN is stored at step 402. Step 403 corresponds to communicating normally through the established RLC level communication connection. Steps 404 and 405 constitute a control loop which the device uses to monitor the state of the communication connection. If a protocol error is noticed at step 404, the device in question becomes the sender in the notation of the above-described examples. At step 406 it increases the value of the RSN by one and at step 407 it sets the Timer_RST. At step 408 it transmits a RESET PDU containing the increased RSN value to the other device which is now in the role of the receiver.

After having transmitted the RESET PDU the sender device starts circulating in the loop consisting of steps 409 and 410 where it constantly checks, whether an acknowledgement is received and whether the timer has expired. Receiving the acknowledgement cause a transition from step 409 to step 411 where the RLC parameters are reset. Thereafter the device increases the current HFN number by one at step 412 and resumes normal communication at step 403. If the timer makes it to expiry before an acknowledgement is received, there follows a transition from step 410 to step 413 where the device checks, whether it has reached the maximum allowable number of resetting attempts. If not, it returns to step 407 where the timer is again set; note that the value of RSN is not increased. A positive finding at step 413 causes the device to abort further resetting attempts and to declare an RLC failure at step 414. The step 406 of increasing the RSN value could be located also in other places outside the loop consisting of steps 407, 408, 409, 410, and 413; it could be for example between steps 409 and 411, between steps 411 and 412 or between steps 412 and 403.

A positive finding at step 405, i.e. the reception of a RESET PDU, means that the device becomes the receiver device in the notation used above. At step 420 it checks the RSN value included in the received RESET PDU and compares it against the RSN value it has previously stored either at the setup phase of the RLC connection or in association with the latest resetting procedure. In a normal case the two RSN values are not the same, which means that the received RESET PDU is a genuine original one and not a resent copy. In such a case the device stores the newly received RSN at step 421, resets the RLC parameters at step 422 and increases the value of the current HFN at step 423 before sending a RESET ACK PDU at step 424. If the two RSN values were found to be equal at step 420, steps 421, 422 and 423 were omitted. After having sent the acknowledgement at step 424 the device returns to the normal communication state at step 403. It should be noted that this does not mean that normal communication continues immediately: it may happen that the acknowledgement sent at step 424 gets lost or corrupted, in which case a new transition from step 405 to step 420 occurs as soon as the device receives a resent copy of the previous RESET PDU.

Figure 4B:
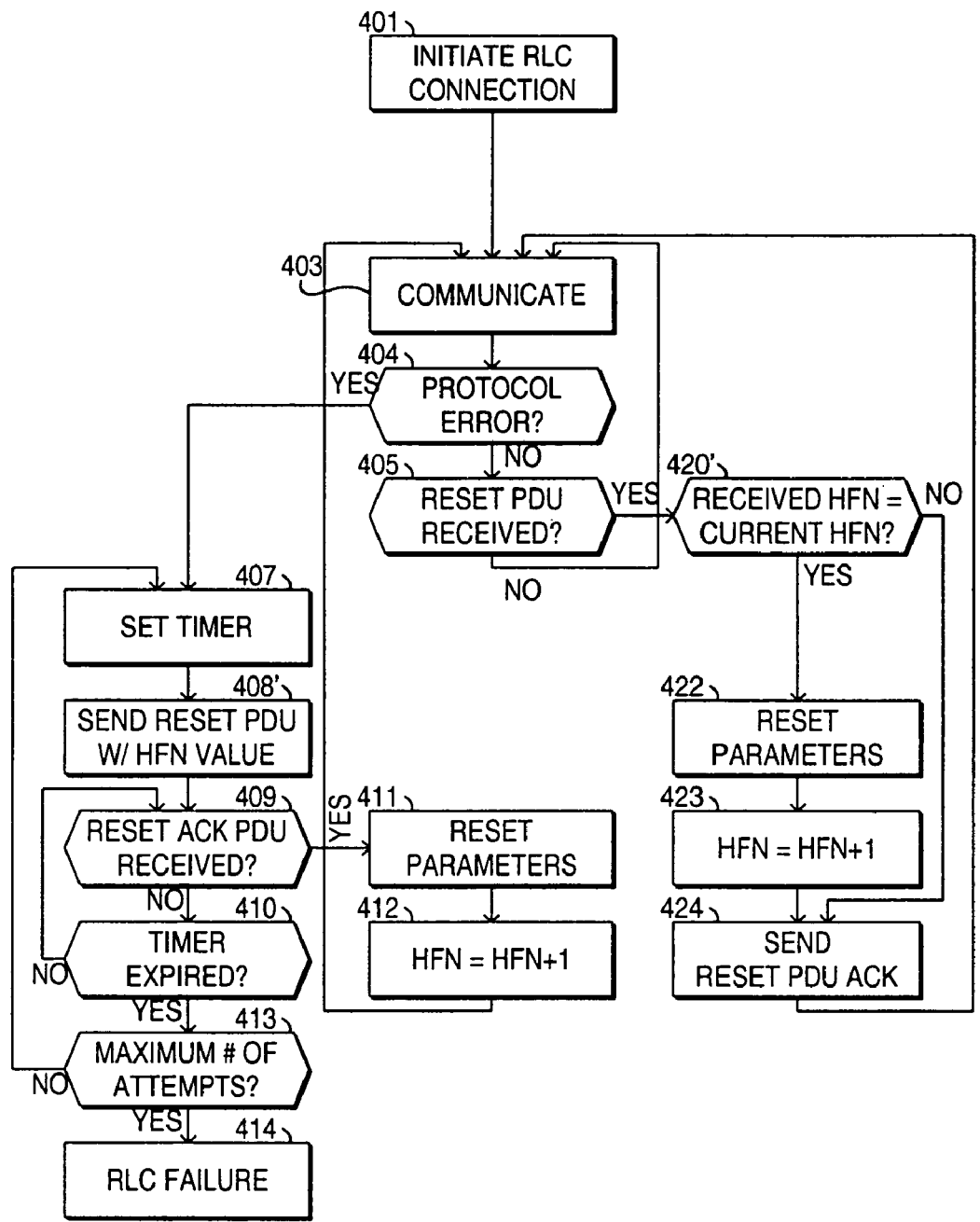
FIG. 4b illustrates the operation of a communication device according to an embodiment of the invention modified from that of FIG. 4a, FIG. 5 illustrates a resetting procedure according to another embodiment of the invention.

A slightly modified version of the embodiment of the invention described above is such where an RSN is not defined at all, but where the current HFN or a derivative thereof is used for the same purpose as the RSN in the above-described embodiment. FIG. 4b illustrates this alternative embodiment. Whenever the sender sends a RESET PDU at step 408', regardless of whether it is a genuine original RESET PDU or a resent copy, it includes into it the current HFN value. When the receiver receives such a RESET PDU, it checks at step 420' whether the HFN value contained therein is the same as the current HFN value of the receiver. If the two HFN values are the same, the receiver knows that this is the first time for it to receive this particular RESET PDU, in which case the receiver performs the parameter resetting 422 and HFN increasing 423 steps. If, however, the HFN value included in the received RESET PDU is smaller than the current HFN value of the receiver, the receiver knows that it has already performed an HFN increasing step in association with the resetting procedure meant by the most recently received RESET PDU, i.e. the most recently received RESET PDU is a resent copy. In such case the receiver does not increase any more its current HFN value but goes directly into the acknowledging step 424. Using the HFN instead of a (potentially very short) sequence number has the drawback that the HFN reserves a relatively large number of bits from the RESET PDU.

In still another slightly modified version of the above-described embodiments the first RESET PDU 203 sent by the sender does not comprise an RSN at all, and all subsequently resent copies like the RESET PDU 210 do contain an RSN value. If a receiving device finds a RSN value in a received RESET PDU, it knows that it is a resent copy and consequently does not make changes in the current HFN value. This embodiment of the invention has the drawback that in a case where the genuine original RESET PDU was lost or corrupted, the receiver can not know whether the resent copy it received refers to some lost or corrupted RESET PDU or to some other, relatively recently successively received genuine original RESET PDU.

In the foregoing we have assumed that it is the sender which includes a sequence number or other information into its transmissions so that the device at the other end may deduce, whether a particular received PDU is a genuine original one or a resent copy. However, basically the same principle of using sequence numbering or corresponding information to prevent synchronization errors can be reduced into practice also by obligating the receiver to include such an indicative piece of information into its acknowledging transmissions. In the following we describe such an alternative embodiment of the invention.

Figure 5:
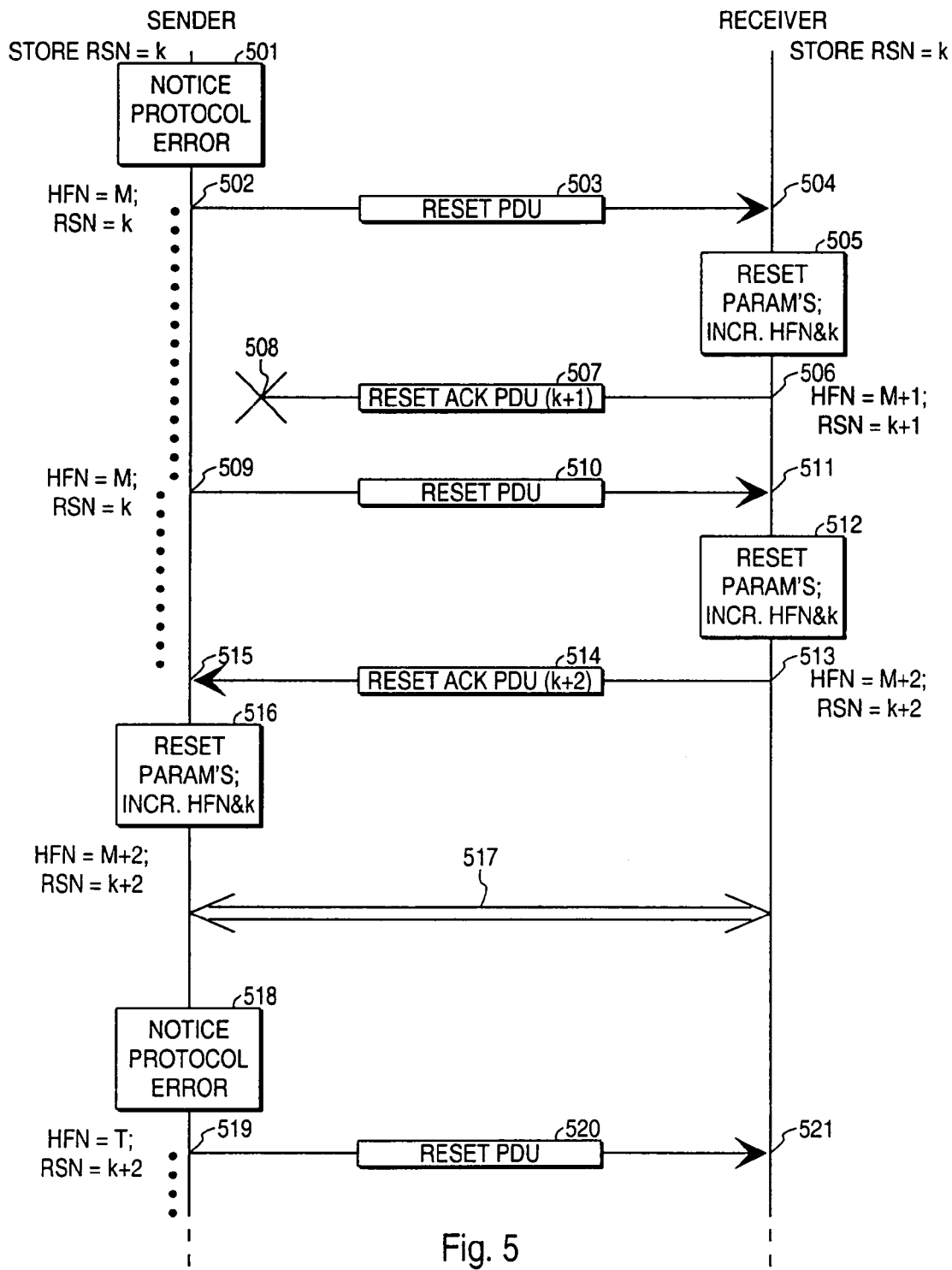

FIG. 5 illustrates a situation where the communicating entities have been designated as the sender and the receiver according to the direction of travel of the first PDU related to the RESET procedure in the same manner as in FIGS. 1 and 2. We assume that as a part of a connection setup process an initial value k has been stored for a sequence number known as the RSN. At step 501 the sender notes a protocol error on the RLC layer, which means that a RESET procedure must be initiated. Let us again assume that the current HFN at the time of discovering the protocol error is M. The sender initiates the RESET prodedure by sending, at step 502, a certain RESET PDU to the receiver. The RESET PDU is designated as 503. At the same time the sender sets the timer Timer_RST. The running time of the timer is again shown in FIG. 5 as a line of black dots.

According to this alternative embodiment of the invention the RESET PDU 503 does not contain a sequence number, but is just a RESET PDU known as such from prior art. At step 504 the receiver receives the RESET PDU 503 and thereby becomes aware of the need for resetting the RLC level operation. It does not receive any sequence numbers, but it has previously stored the initial value k of the RSN. At step 505 the receiver resets all protocol parameters and increases the current value of the HFN by one to M+1. According to this alternative embodiment of the invention the receiver increases also its stored value of the RSN by one to k+1.

After having completed these tasks the receiver sends at step 506 a RESET ACK PDU 507 which differs now from the previously used prior art RESET ACK PDU in that it contains the value k+1 of the RSN which the receiver obtained at step 505. Again we assume that at step 508 the acknowledgement 507 gets lost or corrupted due to a communication error. It never reached the sender in decodable shape, so the sender is not aware of the acknowledgement 507 having been sent at all. At step 509 the Timer_RST expires, which causes the sender to send a new RESET PDU 510. The current HFN value at the sender is still M, and the current RSN value at the sender is still k.

According to this embodiment of the invention the sender may note at step 509 that the new RESET PDU 510 is actually a resent copy of the previous RESET PDU 503, because no acknowledgement was received concerning the previous RESET PDU 503 before the expiry of the Timer_RST. However, such a finding has little significance as the new RESET PDU 510 is again just a RESET PDU known as such from prior art without any reference to the value of the RSN.

At step 511 the receiver receives the latter RESET PDU 510. The receiver has no means of knowing, whether the latter RESET PDU is a resent copy of the previously received RESET PDU 503, so it performs exactly the same protocol parameter resetting step 512, together with again increasing the current values of the HFN and k.

After step 512 the receiver sends at step 513 a new RESET ACK PDU 514 to the sender, and includes again into this PDU the most recently stored value of the RSN, which is now k+2. This time the acknowledgement gets through to the sender, which receives it at step 515. The sender resets all protocol parameters for its part at step 516. By comparing the received RSN value to its own stored value it notes that there is a difference of two, which causes the sender to increases both the current value of the HFN by two to M+2 and the stored RSN value to k+2. One RESET ACK PDU 507 was again lost without a trace, but because the successful RESET ACK PDU 514 contained an updated value of the RSN, the HFN values in the sender and the transmitter became the same after all, which means that the HFN synchronization between the sender and the receiver is maintained. If the first RESET ACK PDU 507 had come through without problems, the RSN value k+1 therein would have made the sender to increase both the current value of the HFN by one to M+1 and the stored RSN value to k+1.

Also in the embodiment of FIG. 5 the operation of the sender and receiver devices remains the same even if also the second RESET ACK PDU 514 were lost or corrupted. In such a case the sender could transmit a third RESET PDU which would still have the same known unnumbered format as the first and second RESET PDUs, so that the steps 511, 512 and 513 would be repeated at the receiver. If a third RESET ACK PDU finally got through, it would contain the RSN value k+3, which would cause the sender to increase its current HFN and stored RSN values by three.

At the next occurrence of a protocol error the stored value of RSN would still initially be the same in both communication devices, so the above-described procedure could be repeated.

Figure 6A:
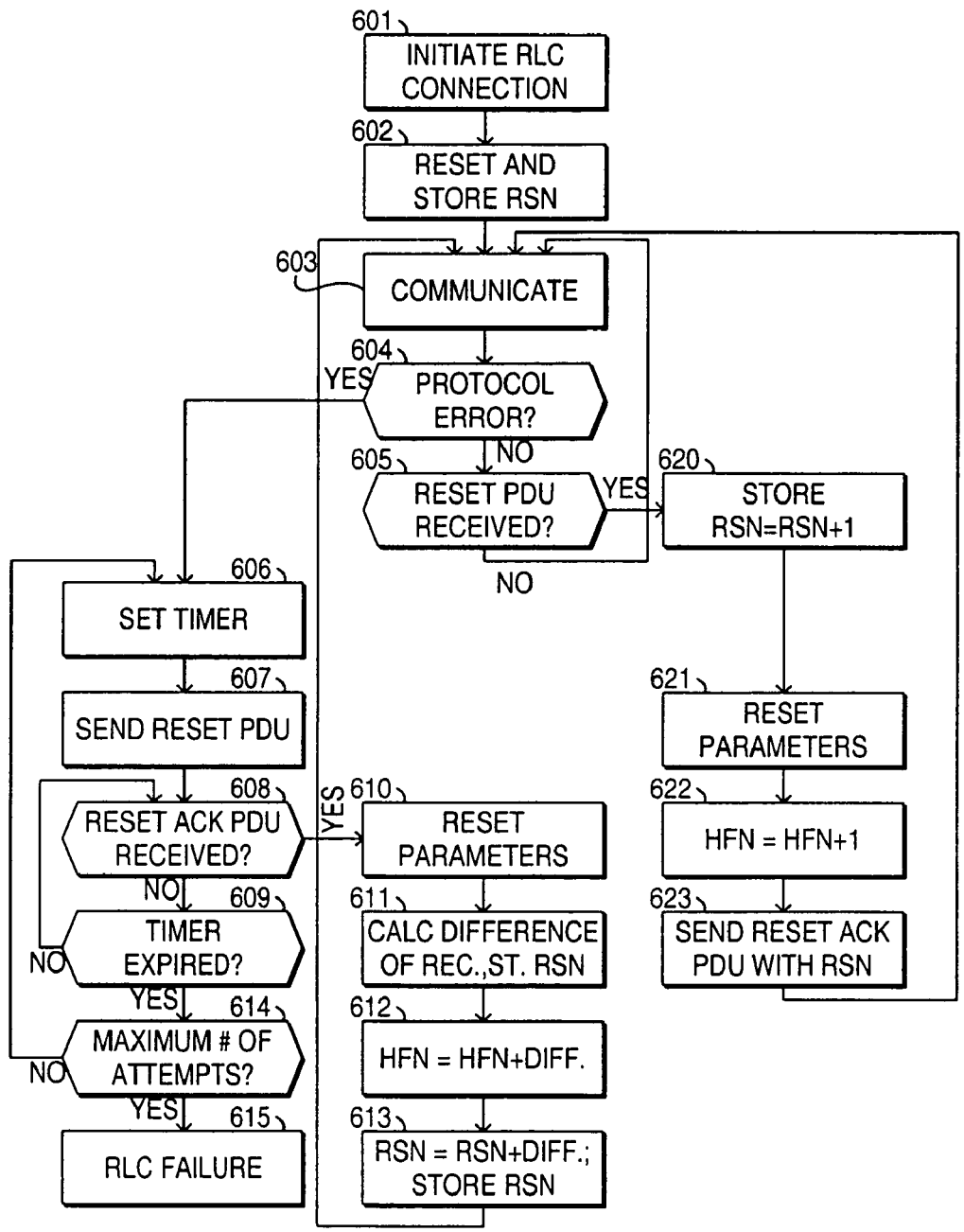
FIG. 6a illustrates the operation of a communication device according to said other embodiment of the invention.

FIG. 6a illustrates the method according to the alternative approach described above in the form of a flow diagram which the operation of a communication device may follow. At step 601 the establishing of an RLC level communication connection is initiated, and as a part of the initiating procedures an initial value for the RSN is stored at step 602. Step 603 corresponds to communicating normally through the established RLC level communication connection. Steps 604 and 605 constitute a control loop which the device uses to monitor the state of the communication connection. If a protocol error is noticed at step 604, the device in question becomes the sender in the notation of the above-described examples. At step 606 it sets the Timer_RST. At step 607 it transmits a RESET PDU to the other device which is now in the role of the receiver.

After having transmitted the RESET PDU the sender device starts circulating in the loop consisting of steps 608 and 609 where it constantly checks, whether an acknowledgement is received and whether the timer has expired. Receiving the acknowledgement cause a transition from step 608 to step 610 where the RLC parameters are reset. Thereafter the device calculates at step 611 the difference between the RSN value it received in the RESET ACK PDU and the RSN value it has itself previously stored. At step 612 it increases the current HFN number by the amount of the calculated difference, and at step 613 it increases the local RSN value also by the amount of the calculated difference and stores the so updated RSN value. Thereafter it resumes normal communication at step 603. If the timer makes it to expiry before an acknowledgement is received, there follows a transition from step 609 to step 614 where the device checks, whether it has reached the maximum allowable number of resetting attempts. If not, it returns to step 606 where the timer is again set. A positive finding at step 614 causes the device to abort further resetting attempts and to declare an RLC failure at step 615.

A positive finding at step 605, i.e. the reception of a RESET PDU, means that the device becomes the receiver device in the notation used above. At step 420 it increases the locally stored RSN value by one before storing it anew. Thereafter the device resets the RLC parameters at step 621 and increases the value of the current HFN at step 622 before sending a RESET ACK PDU at step 623. It includes into the RESET ACK PDU sent at step 623 the recently updated RSN value. After having sent the acknowledgement at step 623 the device returns to the normal communication state at step 603. It should again be noted that this does not mean that normal communication continues immediately: it may happen that the acknowledgement sent at step 623 gets lost or corrupted, in which case a new transition from step 605 to step 620 occurs as soon as the device receives a resent copy of the previous RESET PDU.

Figure 6B:
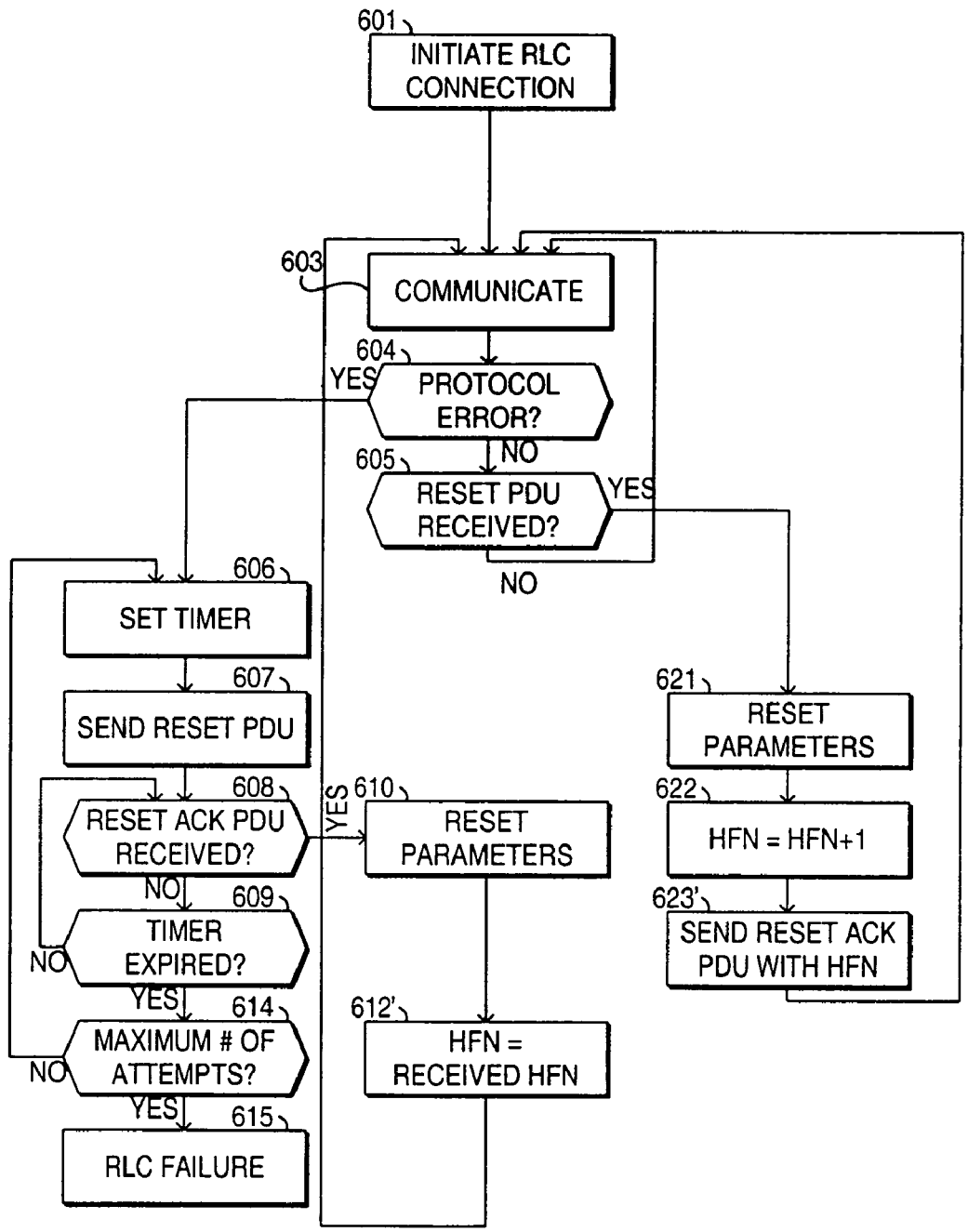
FIG. 6b illustrates the operation of a communication device according to an embodiment of the invention modified from that of FIG. 6a, FIG. 7 illustrates the application of the invention within a structure of protocol layers.

A modified embodiment of the most recently described method can also be presented where again the RSN is completely omitted and the sequential management of the resetting-related PDUs is performed on the basis of HFN values only. FIG. 6b illustrates such a modified embodiment. The difference between the methods of FIGS. 6a and 6b is firstly that there is no RSN initialization step (step 602 in FIG. 6a) in FIG. 6b. Also in the receiver-side operation there is no RSN increasing step (step 620 in FIG. 6a) in FIG. 6b. Step 623' differs from step 623 in that it is not the updated RSN value (which now does not even exist) but the updated HFN value which is included in the RESET ACK PDU. In the sender-side operation the RSN-related steps 611 and 613 of FIG. 6a are missing, and the increasing operation of step 612 in FIG. 6a is simplified to the simple replacement operation of 612' in FIG. 6b where the sender replaces its own current HFN value with the one received in the RESET ACK PDU.

Previously we have noted that the HFN value is much longer in bits than an RSN value, especially if a single bit is used as the RSN. However, the embodiments of the invention which are presented as including a whole HFN value in a RESET PDU or a RESET ACK PDU can be remarkably simplified if one takes into account that the possible loss or corruption of PDUs in either direction may only cause a very small deviation between presumed and correct HFN values. Instead of a complete HFN value it is possible to include in a RESET PDU or a RESET ACK PDU a derivative thereof, for example the least significant bit or two least significant bits of the HFN value. Two bits are enough to indicate deviations of up to four HFNs, which is more than sufficient for most practical cases. Even the use of the least significant bit of the HFN alone (i.e. by stating that the RSN bit described in the RSN-based embodiments above is always equal to the least significant bit of the current HFN value) suffices to solve the problem described in FIG. 1.

The RSN-based and HFN-based embodiments can naturally be combined in several ways, as can the sender-obligating and receiver-obligating embodiments where sender-obligating denotes those embodiments where the sender must insert a certain value related to sequential management of resetting-related PDUs into a PDU and receiver-obligating denotes correspondingly those embodiments where the receiver must insert such a value. Combining the embodiments means that for example the sender includes the RSN value in all transmitted RESET PDUs, and in order to confirm that the HEN synchronization is indeed maintained the receiver includes the current HFN value or a derivative thereof in all transmitted RESET ACK PDUs.

Figure 7:
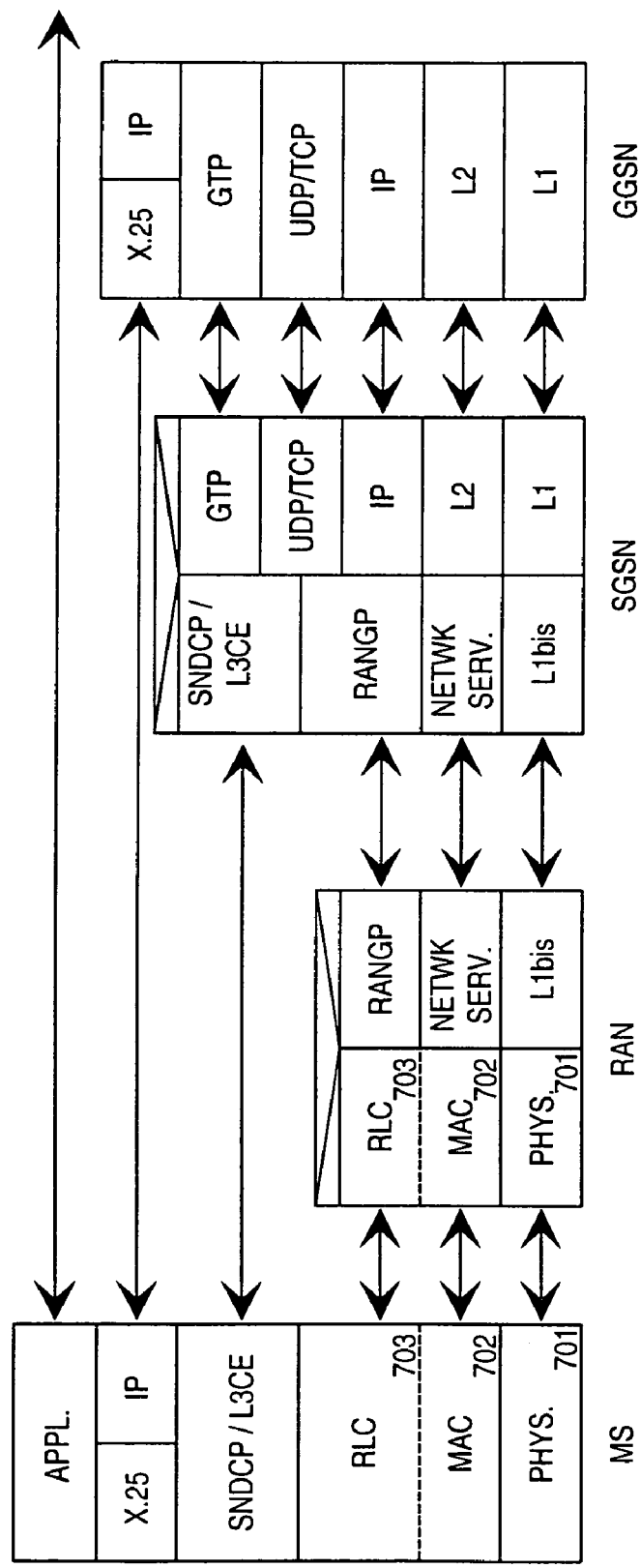

FIG. 7 illustrates a proposed arrangement of data protocol stacks that should be applied in a packet-switched communication connection where one end is a Mobile Station (MS) and the communication takes place over a GPRS network (General Packet Radio Service) through a Radio Access Network (RAN), a Serving GPRS Support Node (SGSN) and a Gateway GPRS Support Node (GGSN). The protocol layers where the peer entities are in the MS and the RAN are the physical layer 701 which is for example the known UMTS physical layer, the Media Access Control (MAC) layer 702 and the Radio Link Control layer 703 which sometimes is regarded as only a part of the MAC layer 702—hence the dashed line between them. Also the known protocol layers where the peer entities are in the RAN and the SGSN, the MS and the SGSN, the SGSN and the GGSN or the MS and the GGSN are shown. However, only data or user plane protocols are shown in FIG. 7; a complete illustration of protocols would include the Layer 3 Mobility Management (L3MM) and Short Message Services (SMS) blocks in parallel with the SubNetwork Dependent Control Protocol (SNDCP). Additionally there are the known Session Management (SM) and Radio Resource management (RR) entities which are not shown in FIG. 7. An application layer in the MS will communicate with a peer entity that is located for example in another MS or some other terminal.

Of the protocol layers of FIG. 7 the invention concerns the RLC layers 703 in the MS and the RAN. Implementing the functionalities of a protocol layer in a communications device is known as such and takes typically the form of programming the required operations of the protocol layer into machine-readable instructions which can be executed by a microprocessor. It is within the capabilities of a person skilled in the art to perform such programming to implement the methods described above in association with FIGS. 2, 4a, 4b, 5, 6a and 6b.

Figure 8:
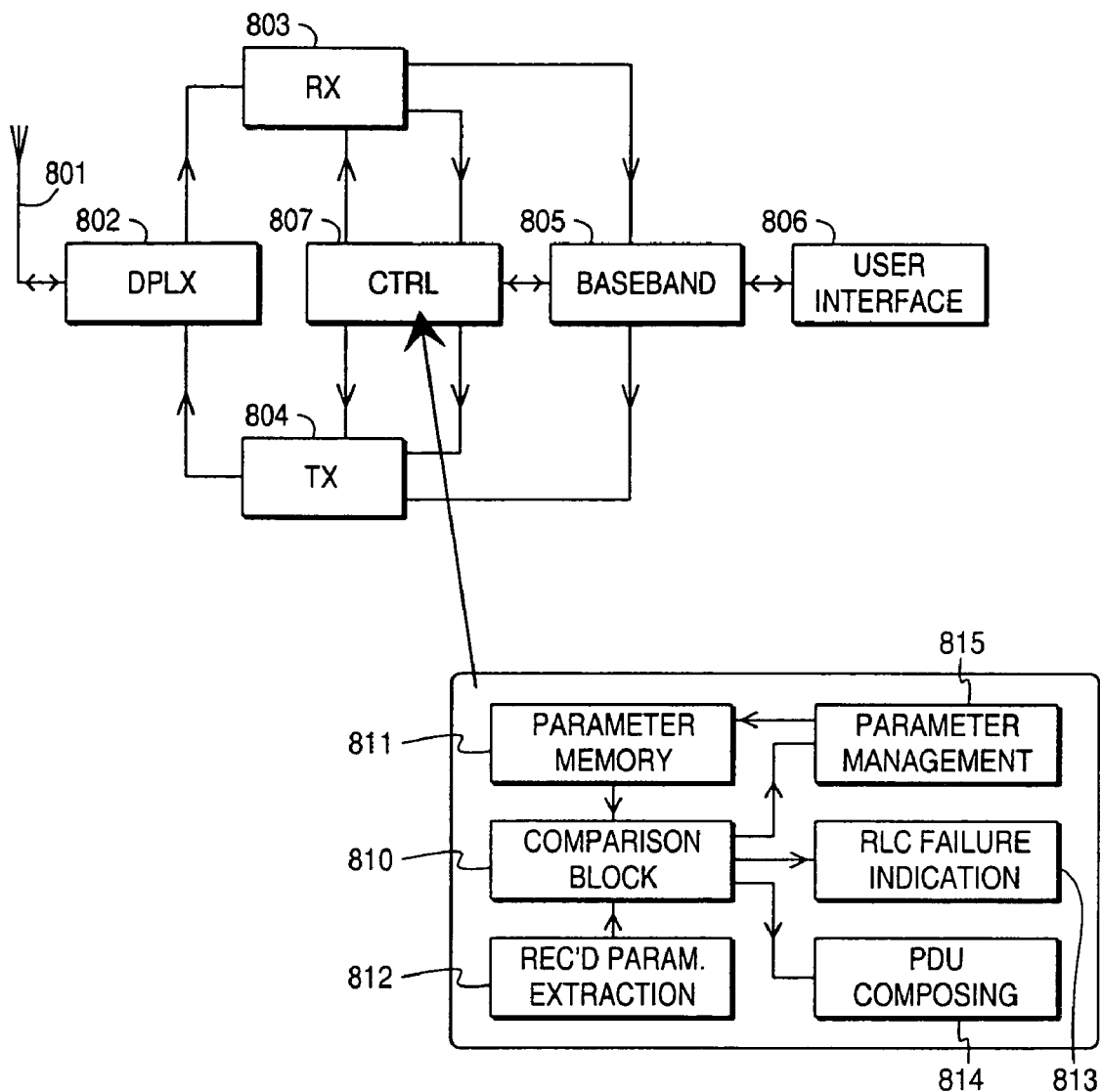
FIG. 8 illustrates a mobile station according to an embodiment of the invention and FIG. 9 illustrates a radio network controller according to an embodiment of the invention.

FIG. 8 illustrates schematically certain parts of a MS according to an embodiment of the invention. An antenna 801 is coupled through a duplexing block 802 to a receiver block 803 and a transmitter block 804. The sink of payload data from the receiver block 803 and the source of payload data to the transmitter block 804 is a baseband block 805 which in turn is coupled to a user interface block 806 for communicating with a human or electronic user. A control block 807 receives control information from the receiver block 803 and transmits control information through the transmitter block 804. Additionally the control block 807 controls the operation of the blocks 803, 804 and 805.

In accordance with the invention, the control block 807 comprises a comparison block 810 which is coupled to a parameter memory 811 for storing HFN values and RSN values if required and to a received parameter extraction block 812 which reads received RSN and/or HFN values or derivatives thereof from received PDUs. An RLC failure indicator entity 813 is provided for indicating an RLC failure if required, and a PDU composing unit 814 is provided for composing the RESET PDUs and RESET ACK PDUs according to need. The parameter management block 815 makes the necessary calculations and increasings of the parameter values before storing them back into the parameter storage 811.

Figure 9:
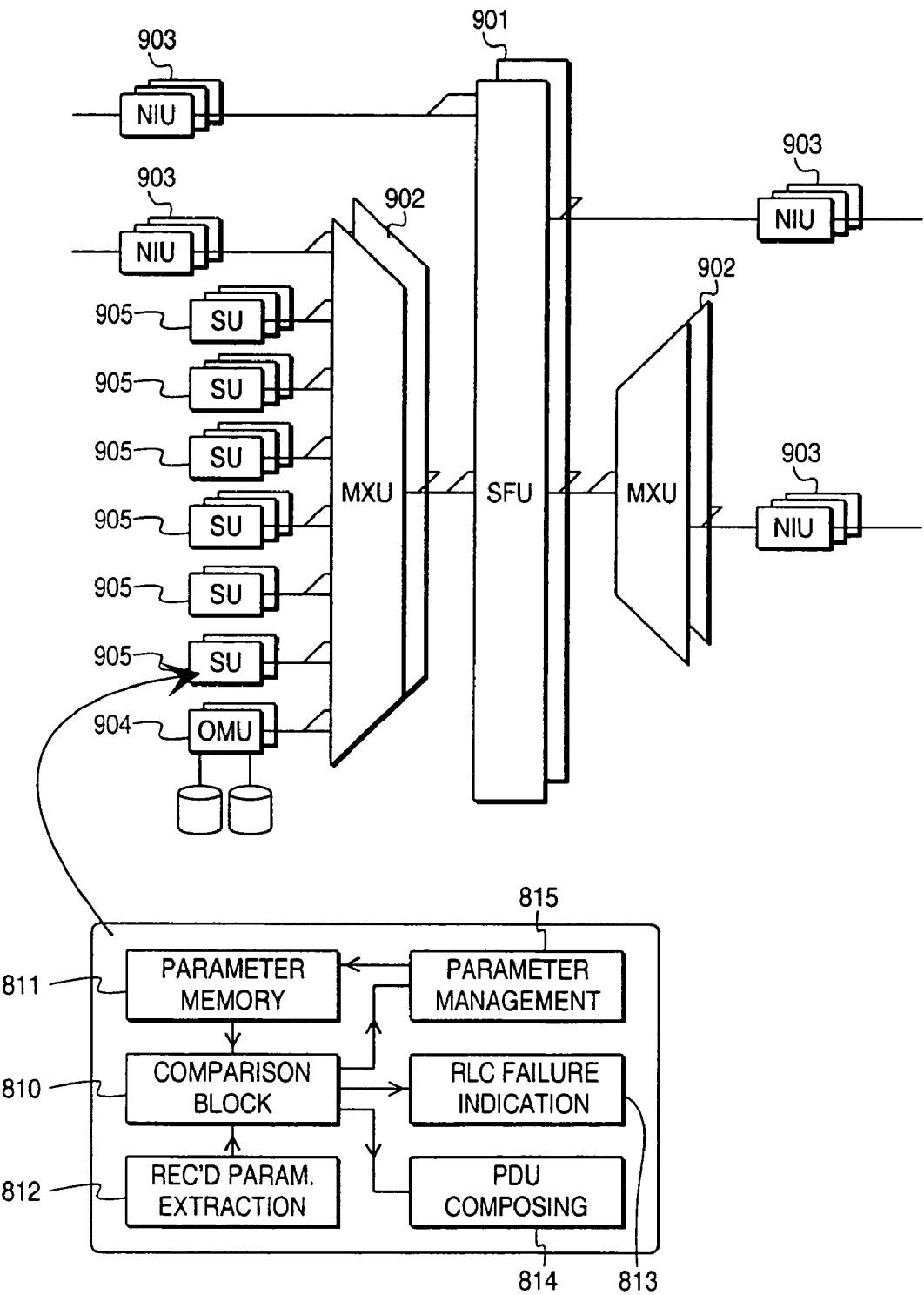
Figure 1:
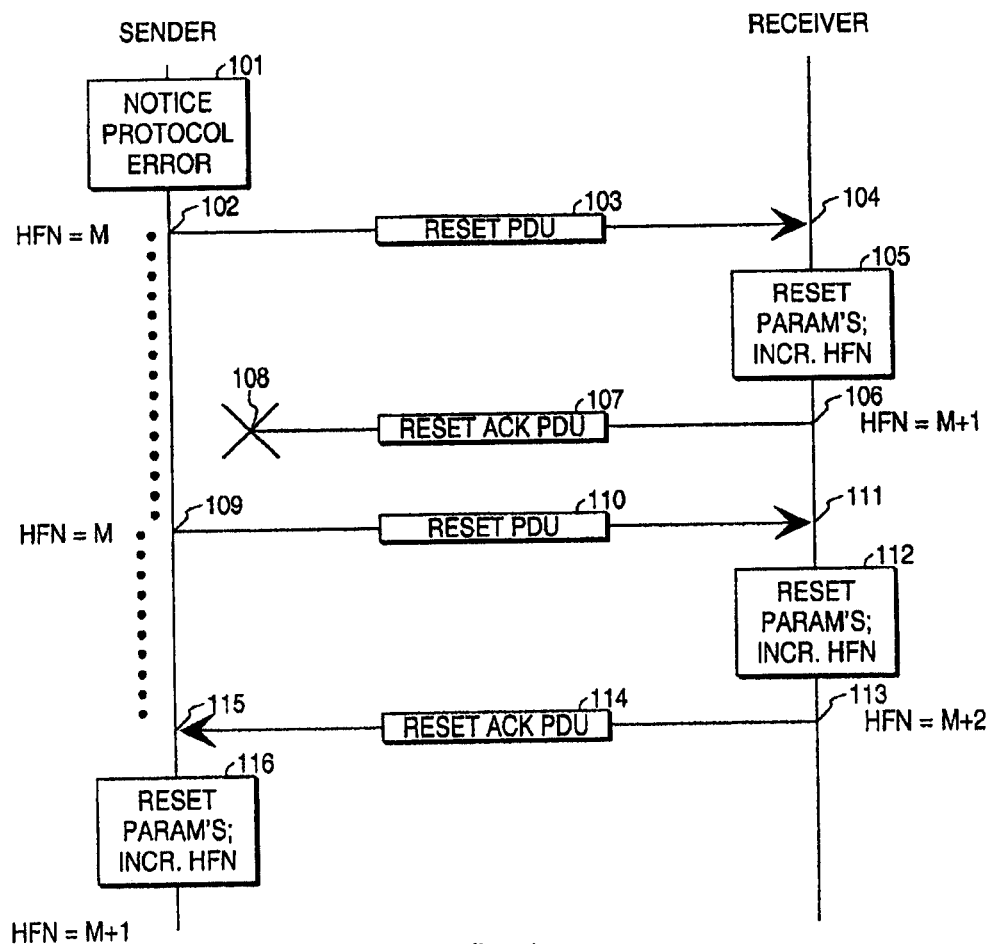

FIG. 9 defines a functional structure of a typical RNC of a cellular radio network, more exactly of a UMTS radio network utilizing WCDMA. The invention must naturally not be considered to be limited thereto. The invention can also be used in other types of cellular radio networks.

The RNC of FIG. 9 comprises a SFU (Switching Fabric Unit) 901 to which several control processor units can be connected. Reliability is typically enhanced by providing hardware level redundancy in the form of parallel redundant units. MXUs (Multiplexing Units) 902 can be used between a number of processor units and the SFU 901 to map the low bitrates from the processor units into the high bitrates of the SFU input ports. The NIUs (Network Interface Units) 903 handle the physical layer connection to different interfaces (e.g. Iub interface towards Node B:s, Iur interface towards other RNCs, Iu interface towards core network nodes). The OMU (Operations and Maintenance Unit) 904 contains the RNC configuration and fault information and can be accessed from an external operations and maintenance center. The SUs (Signalling Units) 905 implement all the control and user plane protocols required in the RNC. Thus, the invention can be implemented in RNC in the Signalling Units by providing therein the PDU and parameter managing entities 810 to 815 in a manner analogous to that described above in association with FIG. 8.

The use of terminology specific to a certain cellular radio system in this patent application should not be construed to place limitations to the applicability of the invention also in other cellular radio systems. The features described in the depending claims are freely combinable unless otherwise explicitly stated.

What is claimed is:

1. A method for resetting a communication connection between a first communication device and a second communication device in a cellular radio system, comprising:
    detecting the need for resetting the communication connection,
    transmitting from the first communication device to the second communication device a first piece of information indicating the need for resetting the communication connection, said first piece of information having an indicator value representing using higher priority for transmitting said first piece of information than for transmitting ordinary data in said communication connection;
    performing a resetting procedure at the second communication device,
    transmitting from the second communication device to the first communication device a second piece of information indicating the completion of the resetting procedure with respect to the second communication device and using higher priority for transmitting said second piece of information than for transmitting ordinary data in said communication connection, and inserting into a certain piece of information transmitted between the first communication device and the second communication device an indication of an effective number of certain resetting operations associated with a certain detected need for resetting the communication connection; and inserting into a certain piece of information, which is transmitted from the first communication device to the second communication device and indicates the need for resetting the communication connection, a sequence number the value of which remains the same—after the need for resetting the communication connection has been detected—from the first step of transmitting from the first communication device to the second communication device a first piece of information indicating the need for resetting the communication connection to the next step of faultlessly receiving, at the first communication device, from the second communication device a second piece of information indicating the completion of the resetting procedure with respect to the second communication device.

2. A method according to claim 1, wherein said sequence number is a single sequence number bit, the value of which remains the same—after the need for resetting the communication connection has been detected—from the first step of transmitting from the first communication device to the second communication device a first piece of information indicating the need for resetting the communication connection to the next step of faultlessly receiving, at the first communication device, from the second communication device a second piece of information indicating the completion of the resetting procedure with respect to the second communication device.

3. A method according to claim 1, wherein said sequence number is a frame structure number indicator, the value of which indicates a certain current frame structure number and remains the same—after the need for resetting the communication connection has been detected—from the first step of transmitting from the first communication device to the second communication device a first piece of information indicating the need for resetting the communication connection to the next step of faultlessly receiving, at the first communication device, from the second communication device a second piece of information indicating the completion of the resetting procedure with respect to the second communication device.

4. A method according to claim 3, wherein said frame structure number indicator is a complete value of a frame structure number.

5. A method according to claim 3, wherein said frame structure number indicator is a shortened derivative from a complete value of a frame structure number.

6. A method according to claim 5, wherein said frame structure number indicator is a group of least significant bits from a complete value of a frame structure number and consists of at least one bit.

7. A method according to claim 1, comprising the steps of:
at the second communication device, checking whether a certain piece of information, which is transmitted from the first communication device to the second communication device and indicates the need for resetting the communication connection, has a sequence number the value of which is the same as the sequence number of an already received piece of information, which was transmitted from the first communication device to the second communication device and indicated the need for resetting the communication connection, and only as a response to a negative finding in said checking, performing a complete resetting procedure at the second communication device.

8. A method according to claim 7, comprising the step of:
only as a response to a negative finding in said checking, increasing the value of a certain frame structure number at the second communication device.

9. A method according to claim 1, comprising the step of inserting into a certain piece of information, which is transmitted from the second communication device to the first communication device and indicates the completion of the resetting procedure with respect to the second communication device, an indication of the result of performing completed resetting operations at the second communication device.

10. A method for resetting a communication connection between a first communication device and a second communication device in a cellular radio system, comprising the steps of:
detecting the need for resetting the communication connection,
transmitting from the first communication device to the second communication device a first piece of information indicating the need for resetting the communication connection,
performing a resetting procedure at the second communication device,
transmitting from the second communication device to the first communication device a second piece of information indicating the completion of the resetting procedure with respect to the second communication device and
inserting into a certain piece of information transmitted between the first communication device and the second communication device an indication of an effective number of certain resetting operations associated with a certain detected need for resetting the communication connection;
inserting into a certain piece of information, which is transmitted from the second communication device to the first communication device and indicates the completion of the resetting procedure with respect to the second communication device, an indication of the result of performing completed resetting operations at the second communication device;
initializing a certain sequence number at both the first and the second communication devices,
as a response to receiving from the first communication device at the second communication device an indication of the need for resetting the communication connection, increasing the value of a frame structure number and said sequence number by equal amount at the second communication device,
inserting the increased value of said sequence number into a certain piece of information, which is transmitted from the second communication device to the first communication device and indicates the completion of the resetting procedure with respect to the second communication device,
as a response to receiving from the second communication device at the first communication device an indication of the completion of the resetting procedure with respect to the second communication device, calculating the difference between the sequence number received within said indication and the sequence number previously stored at the first communication device, and increasing a frame structure number at the first communication device by the amount of said difference.

11. A method according to claim 10, wherein said sequence number is a single bit.

12. A method according to claim 9, comprising the steps of:

as a response to receiving from the first communication device at the second communication device an indication of the need for resetting the communication connection, increasing the value of a frame structure number at the second communication device, inserting an indicator of the increased value of said frame structure number into a certain piece of information, which is transmitted from the second communication device to the first communication device and indicates the completion of the resetting procedure with respect to the second communication device, and as a response to receiving from the second communication device at the first communication device an indication of the completion of the resetting procedure with respect to the second communication device, setting a frame structure number at the first communication device into a value which is equal to that indicated by said indicator which was received from the second communication device.

13. A method according to claim 12, wherein said indicator of the increased value of said frame structure number is the increased value of said frame structure number itself.

14. A method according to claim 12, wherein said indicator of the increased value of said frame structure number is a shortened derivative of the increased value of said frame structure number.

15. A method according to claim 14, wherein said indicator of the increased value of said frame structure number is a group of least significant bits from a complete value of said frame structure number and consists of at least one bit.

16. A communication device for communicating with another communicating device within a cellular radio system over a communication connection, comprising:

means for detecting a need for resetting the communication connection, transmission means for transmitting to the other communication device first pieces of information indicating the need for resetting the communication connection and second pieces of information indicating the completion of the resetting procedure, said first and second pieces of information having an indicator value representing a higher priority for transmitting said first and second pieces of information than for transmitting ordinary data in said communication connection, transmitting receiving means for receiving from the other communication device first pieces of information indicating the need for resetting the communication connection and second pieces of information indicating the completion of the resetting procedure, resetting means for performing a resetting procedure for the communication connection, and means for inserting into a certain piece of information transmitted between it and the other communication device an indication of an effective number of certain resetting operations associated with a certain detected need for resetting the communication connection; and means for inserting into a certain piece of information, which is transmitted between it and the other communication device and indicates the need for resetting the communication connection, a sequence number the value of which remains the same—after the need for resetting the communication connection has been detected—from the first step of transmitting from one of the communication devices to the other a first piece of information indicating the need for resetting the communication connection to the next step of faultlessly receiving, at said one of the communication devices, from the other communication device a second piece of information indicating the completion of the resetting procedure with respect to the other communication device.

17. A communications system for arranging communication between a first communicating device and a second communicating device within a cellular radio system over a communication connection, comprising:

in at least one of the first and second communicating devices, means for detecting a need for resetting the communication connection and transmission means for transmitting to the other communication device first pieces of information indicating the need for resetting the communication connection and second pieces of information indicating the completion of the resetting procedure, said first and second pieces of information having an indicator value representing a higher priority for transmitting said first and second pieces of information than for transmitting ordinary data in said communication connection;

in at least one of the first and second communicating devices, receiving means for receiving from the other communication device first pieces of information indicating the need for resetting the communication connection and second pieces of information indicating the completion of the resetting procedure;

in both said first and second communicating devices, resetting means for performing a resetting procedure for the communication connection; and in at least one of the first and second communicating devices, means for inserting into a certain piece of information transmitted between it and the other communication device an indication of an effective number of certain resetting operations associated with a certain detected need for resetting the communication connection; and in at least one of the first and second communicating devices, means for inserting into a certain piece of information, which is transmitted between it and the other communicating device and indicates the need for resetting the communication connection, a sequence number the value of which remains the same—after the need for resetting the communication connection has been detected—from the first step of transmitting from one of the communicating devices to the other a first piece of information indicating the need for resetting the communication connection to the next step of faultlessly receiving, at said one of the communicating devices, from the other communicating device a second piece of information indicating the completion of the resetting procedure with respect to the other communicating device.

18. A computer program product comprising software means for, when executed in a programmable first communication device, controlling the communication of said communication device with a second communication device within a cellular radio system over a communication connection to comprise the actions of:

detecting the need for resetting the communication connection;

transmitting from the first communication device to the second communication device a first piece of information indicating the need for resetting the communication connection, said piece of information having an indicator value representing higher priority for transmitting said first piece of information than for transmitting ordinary data in said communication connection;

performing a resetting procedure at the second communication device;

transmitting from the second communication device to the first communication device a second piece of information indicating the completion of the resetting procedure with respect to the second communication device and using higher priority for transmitting said second piece of information than for transmitting ordinary data in said communication connection;

inserting into a certain piece of information transmitted between the first communication device and the second communication device an indication of an effective number of certain resetting operations associated with a certain detected need for resetting the communication connection; and inserting into a certain piece of information, which is transmitted from the first communication device to the second communication device and indicates the need for resetting the communication connection, a sequence number the value of which remains the same—after the need for resetting the communication connection has been detected—from the first step of transmitting from the first communication device to the second communication device a first piece of information indicating the need for resetting the communication connection to the next step of faultlessly receiving, at the first communication device, from the second communication device a second piece of information indicating the completion of the resetting procedure with respect to the second communication device.

19. An apparatus, comprising:

a detector configured to detect a need for resetting a communication connection between two communication devices within a cellular radio system;

a transmitter configured to transmit, from one communication device to the other communication device, first pieces of information indicating the need for resetting the communication connection and second pieces of information indicating the completion of the resetting procedure, said first and second pieces of information having an indicator value representing a higher priority for transmitting said first and second pieces of information than for transmitting ordinary data in said communication connection;

a receiver configured to receive from the other communication device first pieces of information indicating the need for resetting the communication connection and second pieces of information indicating the completion of the resetting procedure;

a controller configured to perform a resetting procedure for the communication connection, and to insert into a certain piece of information transmitted between it and the other communication device an indication of an effective number of certain resetting operations associated with a certain detected need for resetting the communication connection, and to insert into a certain piece of information, which is transmitted between it and the other communication device and indicates the need for resetting the communication connection, a sequence number, the value of which remains the same after the need for resetting the communication connection has been detected from the first step of transmitting from one of the communication devices to the other, a first piece of information indicating the need for resetting the communication connection to the next step of faultlessly receiving, at said one of the communication devices, from the other communication device a second piece of information indicating the completion of the resetting procedure with respect to the other communication device.

20. A communications system, comprising:

a first communication device and a second communication device;

in at least one of the first and second communication devices, a detector configured to detect a need for resetting the communication connection and a transmitter configured to transmit to the other communication device first pieces of information indicating the need for resetting the communication connection and second pieces of information indicating the completion of the resetting procedure, said first and second pieces of information having an indicator value representing a higher priority for transmitting said first and second pieces of information than for transmitting ordinary data in said communication connection;

in at least one of the first and second communicating devices, a receiver configured to receive from the other communication device first pieces of information indicating the need for resetting the communication connection and second pieces of information indicating the completion of the resetting procedure;

in both said first and second communicating devices, a controller configured to perform a resetting procedure for the communication connection, wherein in at least one of the first and second communicating devices said controller is configured to insert into a certain piece of information transmitted between it and the other communication device an indication of an effective number of certain resetting operations associated with a certain detected need for resetting the communication connection, and wherein in at least one of the first and second communicating devices said controller is configured to insert into a certain piece of information, which is transmitted between it and the other communicating device and indicates the need for resetting the communication connection, a sequence number the value of which remains the same after the need for resetting the communication connection has been detected from the first step of transmitting from one of the communicating devices to the other a first piece of information indicating the need for resetting the communication connection to the next step of faultlessly receiving, at said one of the communicating devices, from the other communicating device a second piece of information indicating the completion of the resetting procedure with respect to the other communicating device.

21. A computer program product comprising software components that, when executed in a programmable first communication device, are configured to control the communication of said communication device with a second communication device within a cellular radio system over a communication connection to comprise the actions of:

detecting the need for resetting the communication connection;

transmitting from the first communication device to the second communication device a first piece of information indicating the need for resetting the communication connection, said piece of information having an indicator value representing higher priority for transmitting said first piece of information than for transmitting ordinary data in said communication connection;

performing a resetting procedure at the second communication device;

transmitting from the second communication device to the first communication device a second piece of information indicating the completion of the resetting procedure with respect to the second communication device and using higher priority for transmitting said second piece of information than for transmitting ordinary data in said communication connection;

inserting into a certain piece of information, transmitted between the first communication device and the second communication device, an indication of an effective number of certain resetting operations associated with a certain detected need for resetting the communication connection; and inserting into a certain piece of information, which is transmitted from the first communication device to the second communication device and indicates the need for resetting the communication connection, a sequence number the value of which remains the same, after the need for resetting the communication connection has been detected, from the first step of transmitting from the first communication device to the second communication device a first piece of information indicating the need for resetting the communication connection, to the next step of faultlessly receiving, at the first communication device from the second communication device, a second piece of information indicating the completion of the resetting procedure with respect to the second communication device.

* * * * *

UNITED STATES PATENT AND TRADEMARK OFFICE
CERTIFICATE OF CORRECTION

| | | |
|---|---|---|
| PATENT NO. | : 7,171,224 B2 | Page 1 of 2 |
| APPLICATION NO. | : 09/832051 | |
| DATED | : January 30, 2007 | |
| INVENTOR(S) | : Sarkkinen et al. | |

It is certified that error appears in the above-identified patent and that said Letters Patent is hereby corrected as shown below:

The drawing sheet, consisting of Fig. 1, should be deleted to be replaced with the drawing sheet, consisting of Fig. 1 and Fig. 3 as shown on the attached pages.

In Claim 18, col. 16, line 65, after "means" insert -- encoded in a computer readable medium --.

In Claim 18, col. 16, line 65, after "executed" insert -- by a processor --.

In Claim 18, col. 16, line 65, delete the word "for."

In Claim 21, col. 18, line 63, after "components" insert -- encoded in a computer readable medium --.

In Claim 21, col. 18, line 63, after "executed" insert -- by a processor --.

Signed and Sealed this

Eighth Day of June, 2010

David J. Kappos
*Director of the United States Patent and Trademark Office*